(12) United States Patent
Qu

(10) Patent No.: US 9,369,585 B2
(45) Date of Patent: Jun. 14, 2016

(54) METHOD OF REAL-TIME VOIP CALL

(75) Inventor: Yang Qu, Dalian (CN)

(73) Assignee: TEWARE. INC, Dalian, Lianoning (CN)

( * ) Notice: Subject to any disclaimer, the term of this patent is extended or adjusted under 35 U.S.C. 154(b) by 263 days.

(21) Appl. No.: 13/806,846

(22) PCT Filed: Sep. 3, 2011

(86) PCT No.: PCT/CN2011/079310
§ 371 (c)(1),
(2), (4) Date: Dec. 25, 2012

(87) PCT Pub. No.: WO2012/071917
PCT Pub. Date: Jun. 7, 2012

(65) Prior Publication Data
US 2013/0242979 A1  Sep. 19, 2013

(30) Foreign Application Priority Data
Dec. 2, 2010  (CN) .......................... 2010 1 0569473

(51) Int. Cl.
H04L 12/66 (2006.01)
H04M 7/00 (2006.01)
H04M 7/12 (2006.01)
H04L 29/06 (2006.01)
H04M 3/44 (2006.01)

(52) U.S. Cl.
CPC ......... H04M 7/0075 (2013.01); H04L 65/1069 (2013.01); H04M 3/44 (2013.01); H04M 7/128 (2013.01)

(58) Field of Classification Search
CPC ..................... H04L 29/06183; H04L 29/0619; H04L 29/06204; H04L 29/0621; H04L 29/06217; H04L 29/06238; H04L 29/06244; H04L 29/06258; H04L 29/0625; H04L 65/10; H04L 65/1003; H04L 65/1006; H04M 7/0075; H04M 3/44
See application file for complete search history.

(56) References Cited

U.S. PATENT DOCUMENTS

| | | | | |
|---|---|---|---|---|
| 2006/0007915 | A1* | 1/2006 | Frame | 370/352 |
| 2007/0047516 | A1* | 3/2007 | Kottilingal | 370/352 |
| 2011/0299458 | A1* | 12/2011 | Shekalim | 370/328 |

FOREIGN PATENT DOCUMENTS

| | | | |
|---|---|---|---|
| CN | 101292499 A | 10/2008 | |
| CN | 101355532 A | 1/2009 | |
| CN | 102075649 A | 5/2011 | |

*Primary Examiner* — Anh-Vu Ly
(74) *Attorney, Agent, or Firm* — Novick, Kim & Lee, PLLC; Zhi Yang Xue

(57) ABSTRACT

The invention discloses a method of real-time VOIP call, characterized by comprising the following steps: a) a user dials a landline phone and establishes a connection with a service terminal; b) the service terminal resolves a further dialing of the user, corresponds dialing information with an addressing address stored in the service terminal of the calling user, wherein the addressing address comprise a destination user name, a separator and a destination address; c) the service terminal of the calling user resolves information of the destination user name and sends it to a service terminal of the destination address; d) the service terminal of the destination address resolves the received information of the destination user name, and finds the information of the destination user name stored in the service terminal of the destination address, and then the service terminal of the destination address further finds a phone number of the destination user internally stored in the service terminal of the destination address; e) the service terminal of the destination address initiates a call request to the destination user; f) a calling connection is established. This method can achieve video conference and fax in the same way as the existing internet phone, and moreover, it is completely free of charge.

8 Claims, 7 Drawing Sheets

METHOD OF REAL-TIME VOIP CALL

TECHNICAL FIELD

This invention relates to a method of real-time VOIP call, in particular to a method of real-time call method which digits equal to characters as separator for addressing.

BACKGROUND ART

At present, most users are using traditional telephone system as their communicating method. Traditional telephone system comprises PBX, phone and telephone wire. Users are to pay for their calling to the communication operator. Especially for enterprises, it will increase their cost.

Because of the development of VOIP technology, network telephone system is accepted and applied by many enterprises due to its lower cost than traditional telephone system. However the software telephone system exists with its limitations, take Skype (a software of network telephone used widely) for example, it is available only for software telephone to call landline phone (or mobile phone), and the call between software telephones. For the call between software telephones, it might be free of charge because the voice data packet is transmitted by internet; and for the call from software telephone to landline phone (or mobile phone), the network telephone operator will pay the traditional telephone operator because they exist separately, thus the users are to pay (for example: skype recharge) the network telephone operator; it is not available for Skype to achieve the call from landline phone to software telephone and the call between landline phones.

With the developing of network technology, new solutions are being arisen constantly, for example, Cisco-voip shown in FIG. 1, the hardware devices comprise: router, switch, PBX, PC, phone, network cable and telephone wire. PC connected to PBX through network cable, PBX connected to router through network cable, router with its speech interface connected to PBX through telephone wire, and phone connected to PBX through telephone wire. Execution program: for example, company A calls company B. The administrator of company A customizes a prefix number, when company A staff firstly dials the prefix number before dialing phone call, PBX will transmit the voice data packet to the router of company A, and the router of company A will find through addressing the router of company B which has been set in advance (transmission process for calling data is shown as FIG. 2 Cisco-voip process). There is no soft end in this solution, so it is unavailable to achieve the cross dialing between software telephone and landline phone, and between software telephones. It is only available for the cross dialing between landline phones to be free of charge, because the prefix number is customized by enterprise network administrator, who must unify the planning of the routing information of company A and B in advance before cross dialing, thus the routers outside of the unified planning could not exchange with them. In a word, the prerequisite of this solution is that the two companies must be headquarters and branch, and the PBX in this solution must be high end with specific voice interface. Because of the high cost, it is not suitable for most small and medium-sized enterprises.

With the developing of network hardware devices, there is a further development in traditional VOIP solution. Take IPT solution of Cisco for example, Cisco-IPT shown in FIG. 3, the hardware devices comprise: router, switch, call manager (phonological load, distribute extension number for IP telephone), IP telephone, PC and network cable. PC connected to IP telephone through network cable, IP telephone connected to switch through network cable, call manager connected to switch through network cable, and switch connected to router through network cable. For example, company A calls company B. Transmission process for calling data is shown as FIG. 4 Cisco-IPT process, when staff in company A calls staff in company B, he will firstly dial the prefix number (same as in Cisco-VOIP solution, also need the enterprise network administrator to customize in advance), the voice call data packet will be transmitted to the switch, then to call manager. After processing data, call manager will transmit it to the router of company A through switch, and the router of company A will find through addressing the router of company B. In this solution, call manager takes place of the traditional telephone switch, and the soft end phone is added. The prerequisite of this solution is that the planning of the routing information must be unified for company A and B in advance before cross dialing, thus the routers outside of the unified planning could not exchange with them. Which is to say, it will be free of charge in cross dialing only for the companies whose relations are the headquarter and branch. Meanwhile, Because of the high cost for call manager and IP telephone, it is difficult to afford by general small and medium-sized enterprises.

SUMMARY OF THE INVENTION

The invention is to solve the above problems, and provides a method of real-time VOIP call. It can be applied to different hardware environments. Either a enterprise or individual can use the method of real-time VOIP call to achieve calling communication. The invention adopts the technical means as follows:

A method of real-time VOIP call, characterized by comprising the following steps:

a) a calling user dials a landline phone, and establishes a connection with a service terminal of the calling user;

b) the calling user further dials; the service terminal of the calling user performs further resolving and corresponds dialing information with an addressing address stored in the service terminal of the calling user, said addressing address comprises a destination user name, a separator and a destination address, wherein the destination user name and the destination address are separated by the separator, the service terminal of the calling user resolves the destination address on one side of the separator, and sets up connection with a service terminal of the destination address;

c) the service terminal of the calling user resolves information of the destination user name on the other side of the separator, and sends it to a service terminal of the destination address;

d) the service terminal of the destination address resolves the received information of the destination user name, and corresponds the information of the destination user name with user information stored in the service terminal of the destination address; if the information of the destination user name matches information of a user in the stored user information, the service terminal of the destination address further finds out information of a landline phone in the information of the user which is internally stored in the service terminal of the destination address;

e) the service terminal of the destination address initiates a calling request to the landline phone of a destination user;

f) the destination user accepts the request, and establishes a calling connection.

The dialing in said step b is button dialing or voice dialing.

The separator in said step b refers to a symbol for distinguishing the user name from the destination address, namely that the separator is a kind of symbol or a symbol different from the user name and the destination address; said destination address is used to identify a location of a service terminal, and can be an IP address, a domain name or a host name.

The present invention can customize its favorite digits to be equivalent to the addressing address of the destination user, thereby greatly reducing the length of dialing number so as to further facilitate the user; by means of the present invention, the enterprises can achieve free dialing between landline phones, thereby saving money greatly. The traditional VOIP is a large server cluster with all user information being stored in the server cluster, whilst the present invention distributes the servers over individual enterprise or third party operators, thereby reducing the load and cost of the servers. By using the present invention, it can also achieve video conference and fax in the same way, and it is completely free of charge.

Compared with the traditional telephone system, Skype, Cisco-voip solution and Cisco-IPT solution, this invention has the advantages as follows:

In which: the fields in the table below are explained as follows:

|     |                | Traditional telephone system | Skype | Cisco-VOIP H-B | Cisco-VOIP NH-B | Cisco-IPT H-B | Cisco-IPT NH-B | Present invention |
| --- | -------------- | ---------------------------- | ----- | -------------- | --------------- | ------------- | -------------- | ----------------- |
| T-T | Equipment cost | L                            | X     | H              | H               | H             | H              | L                 |
|     | Call charge    | H                            | X     | 0              | H               | 0             | H              | 0                 |
| T-S | Equipment cost | X                            | X     | X              | X               | H             | H              | L                 |
|     | Call charge    | X                            | X     | X              | X               | 0             | H              | 0                 |
| S-S | Equipment cost | X                            | L     | X              | X               | H             | H              | L                 |
|     | Call charge    | X                            | 0     | X              | X               | 0             | H              | 0                 |
| S-T | Equipment cost | X                            | L     | X              | X               | H             | H              | L                 |
|     | Call charge    | X                            | L     | X              | X               | 0             | H              | 0                 |

H-B: indicates that the enterprises calling each other are of headquarter and branch.
NH-B: indicates that the enterprises calling each other are independent enterprises.
T-T: indicates that landline phone calls landline phone.
T-S: indicates that landline phone calls software telephone.
S-S: indicates that software telephone calls software telephone.
S-T: indicates that software telephone calls landline phone.
L: indicates a low cost.
H: indicates a high cost.
0: indicates a cost of zero.
X: indicates that it is unable to achieve.

EMBODIMENT OF THE INVENTION

Figure 1:
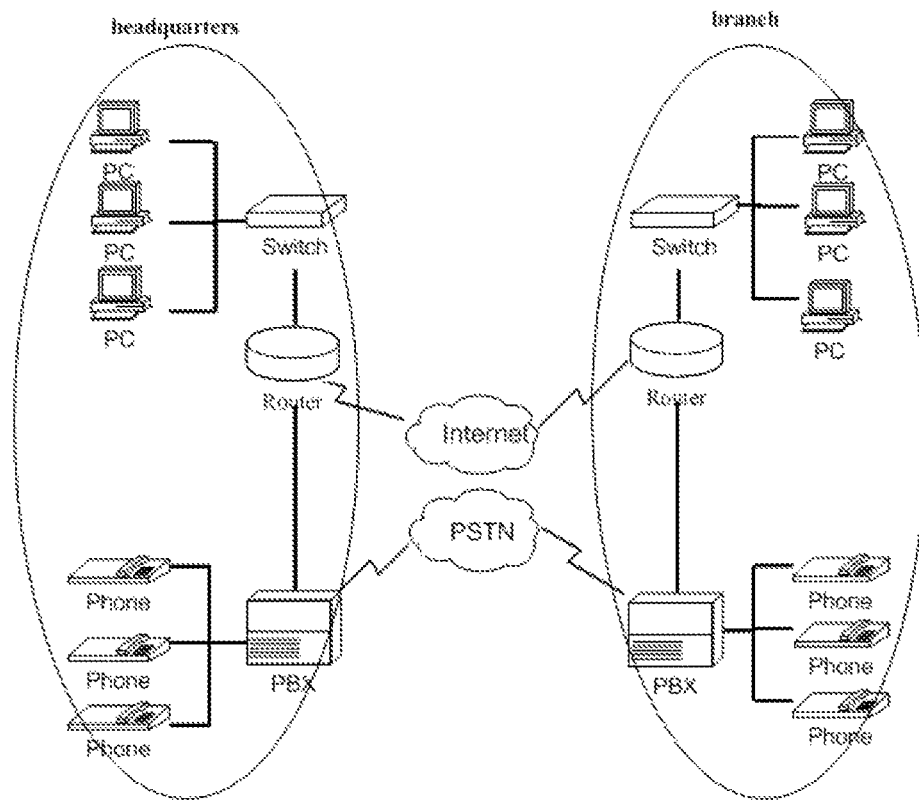
FIG. 1: a diagram of the system structure of Cisco-voip in the prior art.
Figure 2:
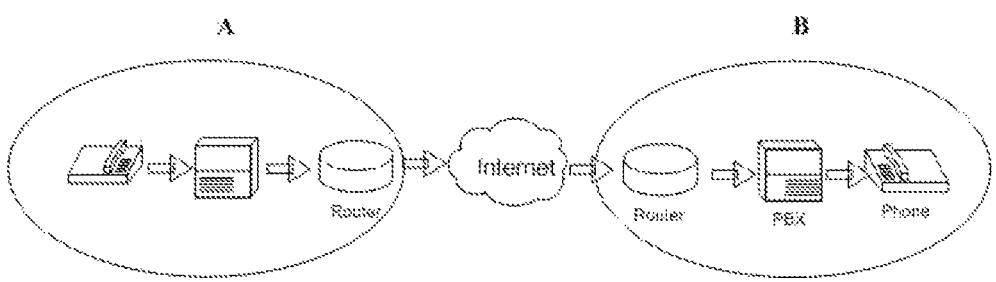
FIG. 2: a diagram of call data transmission procedure in the system shown in FIG. 1.
Figure 3:
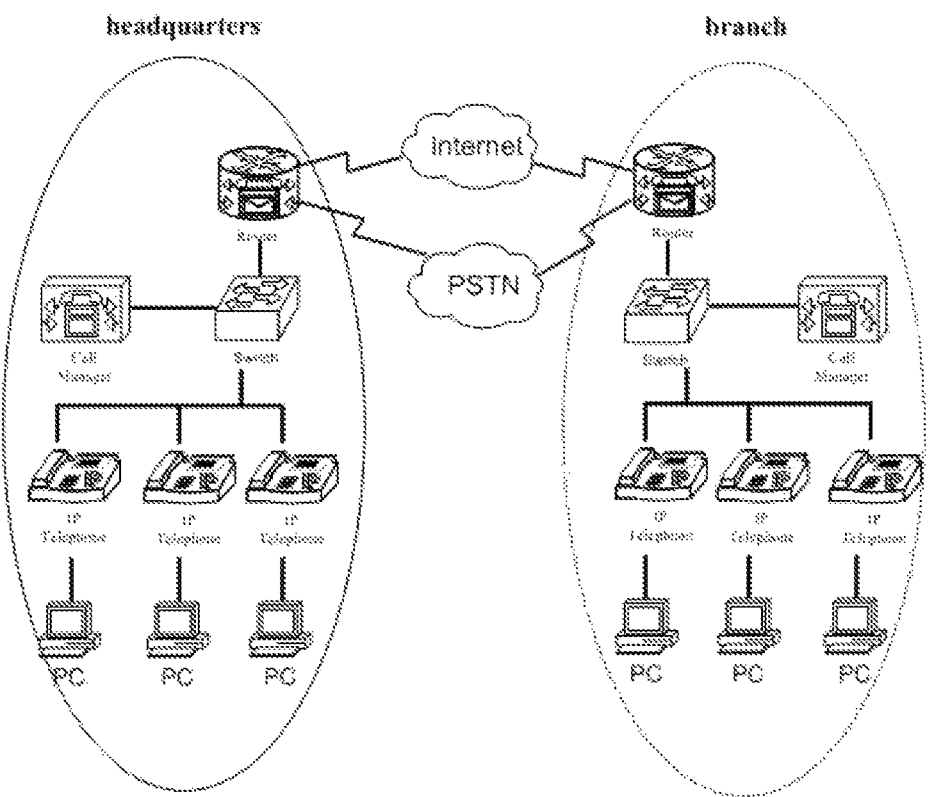
FIG. 3: a diagram of the system structure of Cisco-IPT in the prior art.
Figure 4:
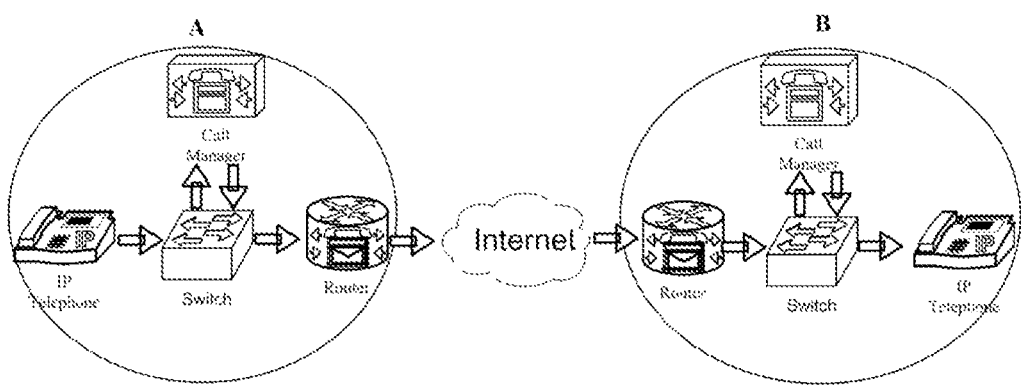
FIG. 4: a diagram of the call data transmission procedure in the system shown in FIG. 3.
Figure 5:
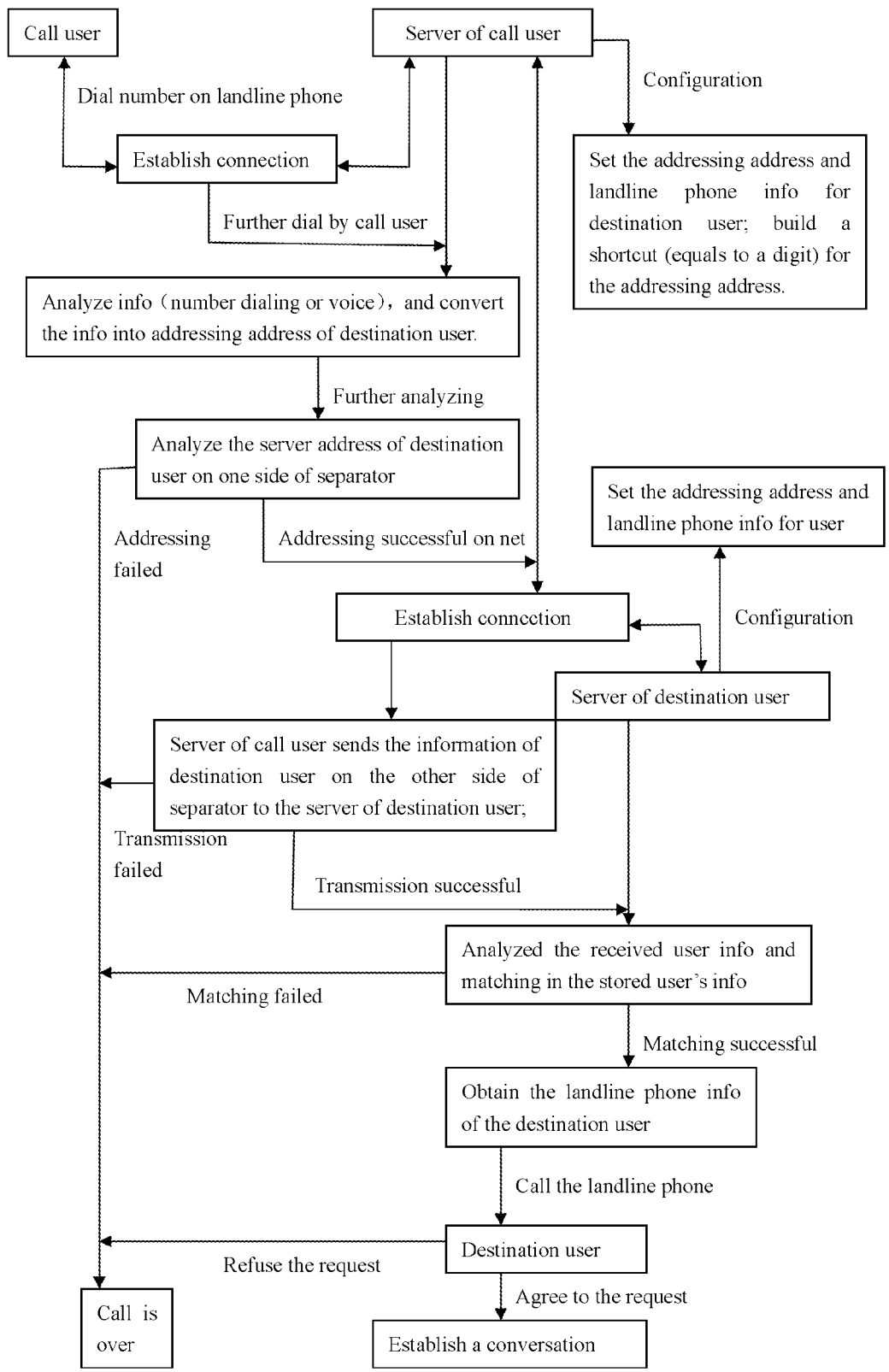
FIG. 5: a flow chart of the method according to this invention.

The method of real-time VOIP call shown in FIG. 5 comprises the following steps:

a) a calling user dials a landline phone, and establishes a connection with a service terminal of the calling user;

b) the calling user further dials; the service terminal of the calling user performs further resolving and corresponds dialing information with an addressing address stored in the service terminal of the calling user, said addressing address comprises a destination user name, a separator and a destination address, wherein the destination user name and the destination address are separated by the separator, the service terminal of the calling user resolves the destination address on one side of the separator, and sets up connection with a service terminal of the destination address;

c) the service terminal of the calling user resolves information of the destination user name on the other side of the separator, and sends it to a service terminal of the destination address;

d) the service terminal of the destination address resolves the received information of the destination user name, and corresponds the information of the destination user name with user information stored in the service terminal of the destination address; if the information of the destination user name matches information of a user in the stored user information, the service terminal of the destination address further finds out information of a landline phone in the information of the user which is internally stored in the service terminal of the destination address;

e) the service terminal of the destination address initiates a calling request to the landline phone of a destination user;

f) the destination user accepts the request, and establishes a calling connection.

In addition, the separator in step b refers to a symbol for distinguishing the user name from the destination address, namely that the separator is a kind of symbol or a symbol different from the user name and the destination address; said destination address is used to identify a location of a service terminal, and can be an IP address, a domain name or a host name.

Embodiment 1

Implementation Way of Enterprises

Figure 6:
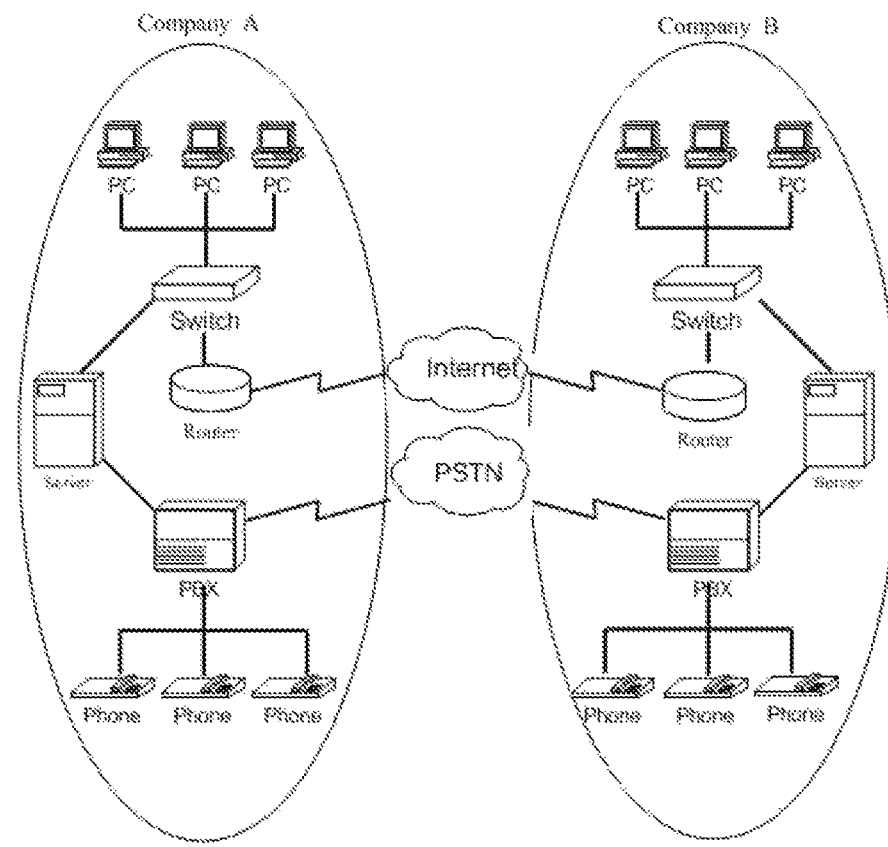
FIG. 6: a diagram of the system structure in an embodiment in which an enterprise deploys this invention.

The hardware environment comprises PBX, server, PBX, router, voice interface card, PC, phone, network cable and telephone wire. The connection of hardware devices is shown as enterprise deployment of FIG. 6. PC is connected to PBX through network cable, voice interface card is connected to server, server is connected to PBX through the interface of voice interface card by network cable, phone is connected to PBX through telephone wire, server is connected to PBX through network cable, and PBX is connected to router through network cable.

Main functions of service terminal are: to manage users, to receive voice packets on the voice interface card, and to transfer the voice packets (this is a common technology in the prior art, and is therefore not described more here). Main functions of client terminal are: to set the digits on landline phone as being equivalent to the addressing communication means with special character being separator, to dial number, to answer and to hang up.

The call method of the present invention will be described by taking the case of user X of company A calling user Y of company B as an example. Company A and B should have the hardware configurations shown as above. The domain names of the companies here act as destination addresses; assuming that the domain name of company A is: example-A.com (the server address may also be used as the destination address, for example: 192.168.1.10), and the network administrator of company A assigns user X with the user name of jia, his addressing address is: jia@example-A.com (@ here acts as a separator, which normally can adopt all the characters available on keyboard with the exception of letter and number keys, such as ~ ! @ # $ % ^ & * ( ) ? . . . \ |, { } " '/+ << >> < >: ; etc.; assuming that the domain name of company B is: example-B.com, and the network administrator of company B assigns user Y with the user name of yi, his addressing address is: yi@example-B.com.

In which, phone: to transform the dialing information of users and the voice collected by telephone receiver into analog signals and to transmit the analog signals; to transform the received analog signals into voice and to play the voice through the telephone receiver. PBX: to assign the branch number; to receive (transmit) the analog signals or digital signals. Voice interface card: to receive and process the analog signal or digital signals. Server: to receive the digital signals, and to packetize the digital signals in a packet; to process the packet; and to transform the packet into digital signals and to transmit the digital signals. Switch: to receive and transmit the packet. Router: to send the packet to network by routing selection.

PBX (Private Branch Exchange): Its full name is a stored program control telephone switching system. It is an automatic telephone switching system which controls connection based on procedures pro-programmed by a computer. PBX comprises hardware and software: hardware includes telephone line, control devices and input/output devices. Software includes program and data. This invention has no special requirements on PBX, and the ordinary PBX will satisfy the application. Server: It is a computer that operates management software in local area network to control the access to network or network sources (disc drive, printer etc.), and can provide computers in network with resources and make them operate as work station. The voice interface card needs to be connected with server in the invention. The card has various kinds of interfaces, and so it will be sufficient for the server to have the interface matching with the voice interface card. For example: when the voice interface card is of PCI interface, it will demand server to be integrated with the PCI slot; when the voice interface card is of PCI-E interface, it will demand server to be integrated with the PCI-E slot; when the voice interface card is of USB interface, it will demand server to be integrated with the USB interface (this is a common technology presenting the prior art, and is therefore not described more here). Switch: It is an aggregation unit that includes the functions of traffic carrying unit, exchange level, controlling and signaling unit in network node. The switch can connect the user line, telecom circuit and/or other units based upon the individual user's demanding. This invention has no special requirements on switch, and all the switches will satisfy the application. Router: It is the device connecting the local/wide area networks in internet, and can automatically choose and set the route according to the channel condition so as to send signals according to priority in the best route. This invention has no special requirements for switch, and all the routers will satisfy the application. Voice interface card: It is the interface card or device containing the voice interface that can process analog signals or digital signals.

After connecting hardware, PBX will detect the connected devices, and the extension numbers of telephone and voice interface card can be set by PBX management.

Setting of PBX in company A: network administrator will firstly assign the branch number 100 to the voice interface card of server by PBX management; the extension number assigned to user X is 601.

Setting of PBX in company B: network administrator will firstly assign the branch number 200 to the voice interface card of server by PBX management; the extension number assigned to user Y is 801.

Service Terminal Initialization:

Service terminal initialization of company A: the network administrator adds user X as jia in the service terminal of the company, and binds the extension number (namely the telephone number information) with 601.

Service terminal initialization of company B: the network administrator adds user Y as yi in the service terminal of the company, and binds the extension number (namely the telephone number information) with 801.

Figure 8:
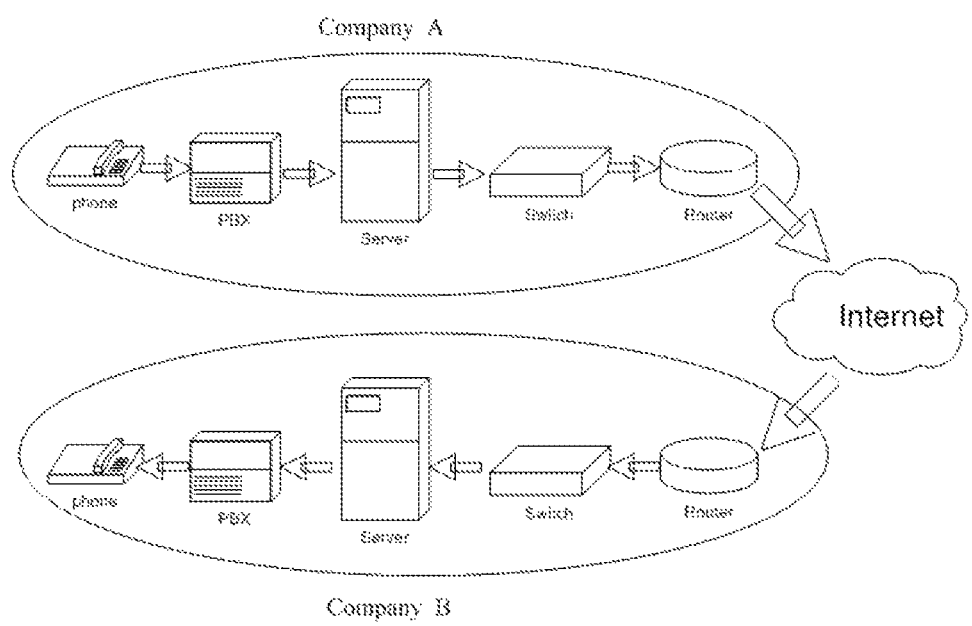
FIG. 8: a diagram of data transmission procedure in an embodiment in which an enterprise deploys this invention.
Figure 7:
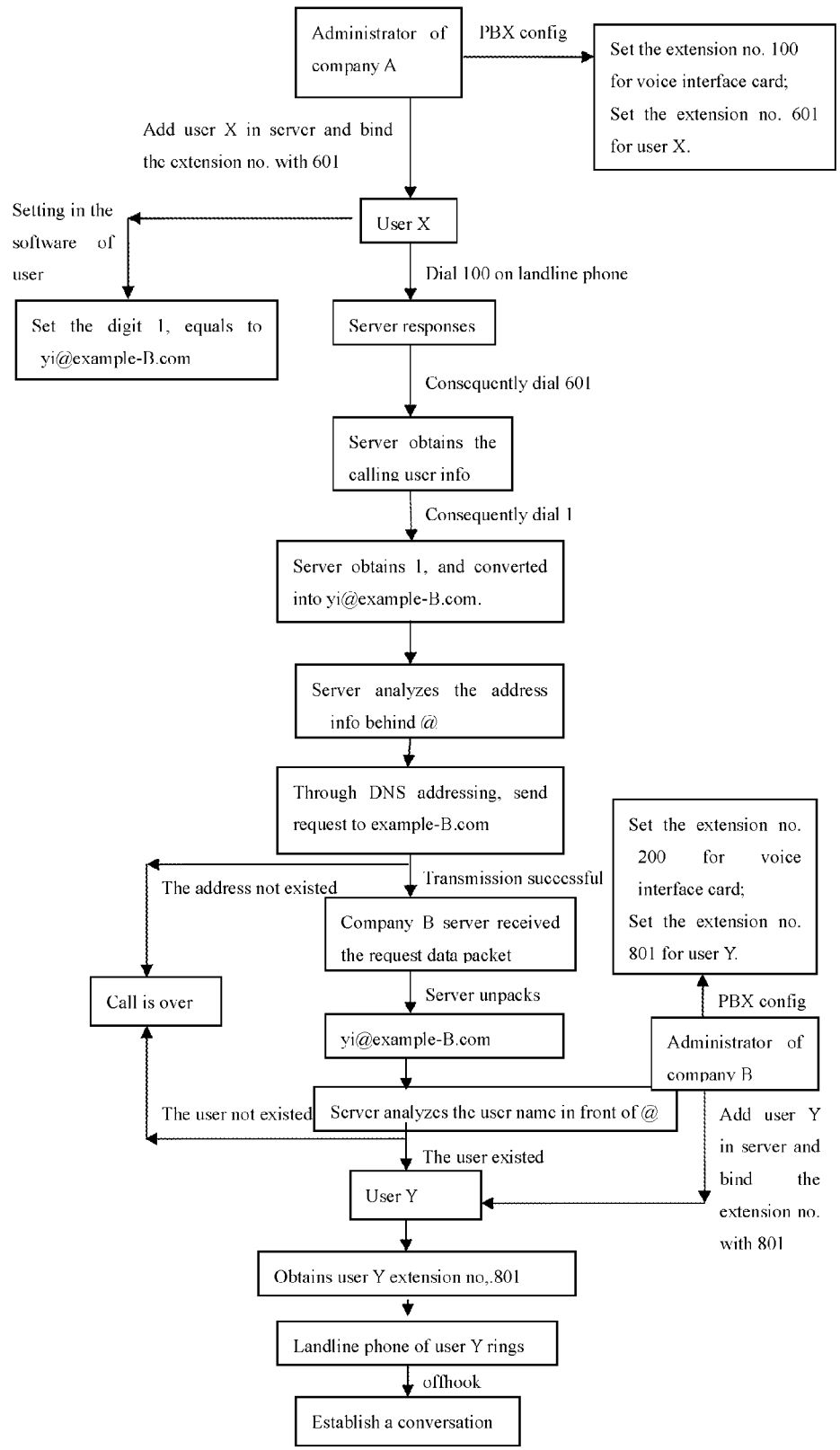
FIG. 7: a flow chart of calling in an embodiment in which an enterprise deploys this invention.

Client Terminal Initialization:

Company A user X logs in the company server with user name jia through client terminal, sets digit 1 (this digit is customized and the number of the digits is defined by the user itself) as being equivalent to yi@example-B.com (the addressing address of company B user Y). The setting can be synchronized on the server at the same time, and the server will store the setting. After finishing the initialization, user can achieve call dialing. In details:

a) User X takes telephone receiver off hook, firstly dials the extension number 100 of voice interface card of company A, thus triggers dialing (button dialing or voice dialing) signal. Through the processing of telephone set (different telephone sets will cause different processing, e.g. the coding by DTMF or FSK etc.), it becomes analog signal that contains dialing information, which is then sent to the PBX of company A. The PBX of company A will initiate the call request to destination terminal based on the corresponding list of internal port, and at this time the server of company A responses, accepts the request and establishes the connection; then user X dials his own extension number 601, which is processed into analog signal that contains dialing information by the telephone set of user X and is sent to the server of company A.

b) The voice interface card on the server of company A receives the analog signal. Through DTMF, FSK or other coding/decoding method (the coding/decoding methods depends on the telephone set and PBX settings), the server of company A will decode the obtained analog signal that contains dialing information into digital signal; the server will convert the digital signal into corresponding data packet, and through unpacketizing, the server will obtain the dialing information [601], and then obtain the detailed information of the user. User X continue to dial the set digit 1, which is processed into analog signal that contains dialing information by the telephone set of user X and is sent to the server of company A (this sentence belongs to step a, but is described in step c on purpose in order to facilitate understanding); at this time, the server will decode the analog signal that contains dialing information into digital signal through DTMF, FSK or other coding/decoding method (this sentence belongs to step b, but is described in step c on purpose in order to facilitate understanding); the server will convert the digital signal into corresponding data packet and obtain the dialing information [1] through unpacking, and convert the digit 1 set at the service terminal into data packet in which the equivalent addressing address is yi@example-B.com.

c) The server of company A resolves the server address example-B.com behind the character @. If this server address is valid and existed, the server of company A will, through DNS (domain name server) addressing, send the voice request packet to the server address example-B.com (the address of the server of company B) behind the character @.

d) The server of company B receives the voice request packet, and will unpacketize it and resolve the user name yi in front of the character @. At this time, the server of company B will judge whether the user name yi is existed, and if existed, the server of company B will extract the corresponding extension number 801;

e) And initiate the call request to the client terminal of user Y, and send the call request to 801 through PBX at the meantime.

f) At this time the client terminal of user Y responses, and the extension 801 rings. User Y can receive the request and establish a conversation either through the client terminal or through picking up his own branch telephone. (Such calling process is as shown in the flow chart of calling in the mode of enterprises in FIG. 7; the voice data transmission in hardware is shown the data transmission diagram in the mode of enterprises in FIG. 8). The above case is an example in which the call is from landline phone to landline phone (or PC). Step a can also be omitted when PC is used to call directly the landline phone (or PC). When PC initiates the calling, it is not necessary to receive the analog signal, but directly enter into step c, and in this case the 1 in step c is not extracted from data packet, and instead, the server obtains the digit [1] inputted by the user inputs and converts, through service terminal, into the data packet in which the special character acts as the separator (yi@example-B.com); the subsequent steps are the same.

Embodiment 2

Implementation Way of Ordinary Users

Figure 9:
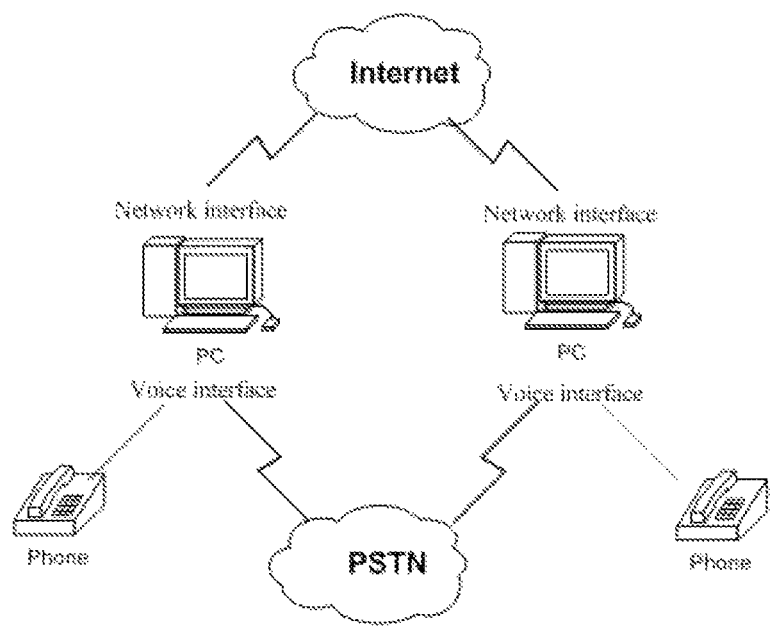
FIG. 9: a diagram of the system structure in an embodiment in which an ordinary user deploys this invention.

The hardware environment comprise PC, phone, voice interface card, network cable and telephone wire. The connection of hardware devices is shown as FIG. 9. Voice interface card is connected to PC, phone is connected to Voice interface card through telephone wire, PSTN is connected to Voice interface card through telephone wire, and PC is connected to internet through network cable. Main functions of ordinary user terminal: to set the digits on landline phone as being equivalent to the addressing means with special characters being a separator, to receive the voice packet on the voice interface card, to forward the voice packet, to set the voice intercept number (which can adopt*, # or the combined numbers on phone. We here take # for example), to dial number, to answer and to hang up.

The following is an example in which user X calls user Y. The users should have the hardware configurations described above. Same as embodiment 1, the domain names of the companies act as destination addresses. Assume that the domain name applied by user X is: example-A.com (the server address may also be acted as the destination address, for example: 192.168.1.10); the addressing address of user X is: jia@example-A.com; the domain name applied by user Y is: example-B.com, the addressing address of user Y is: yi@example-B.com.

Figure 11:
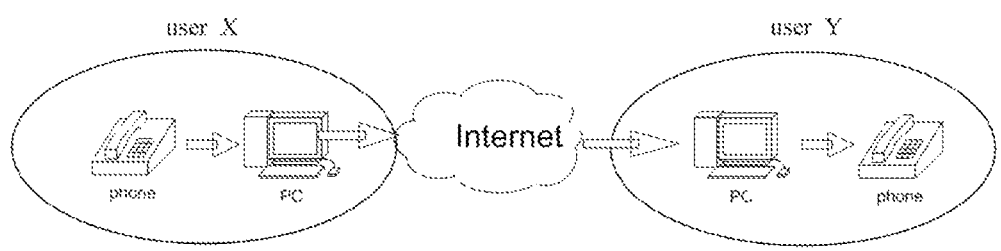
FIG. 11: a diagram of data transmission procedure in an embodiment in which an ordinary user deploys this invention.
Figure 10:
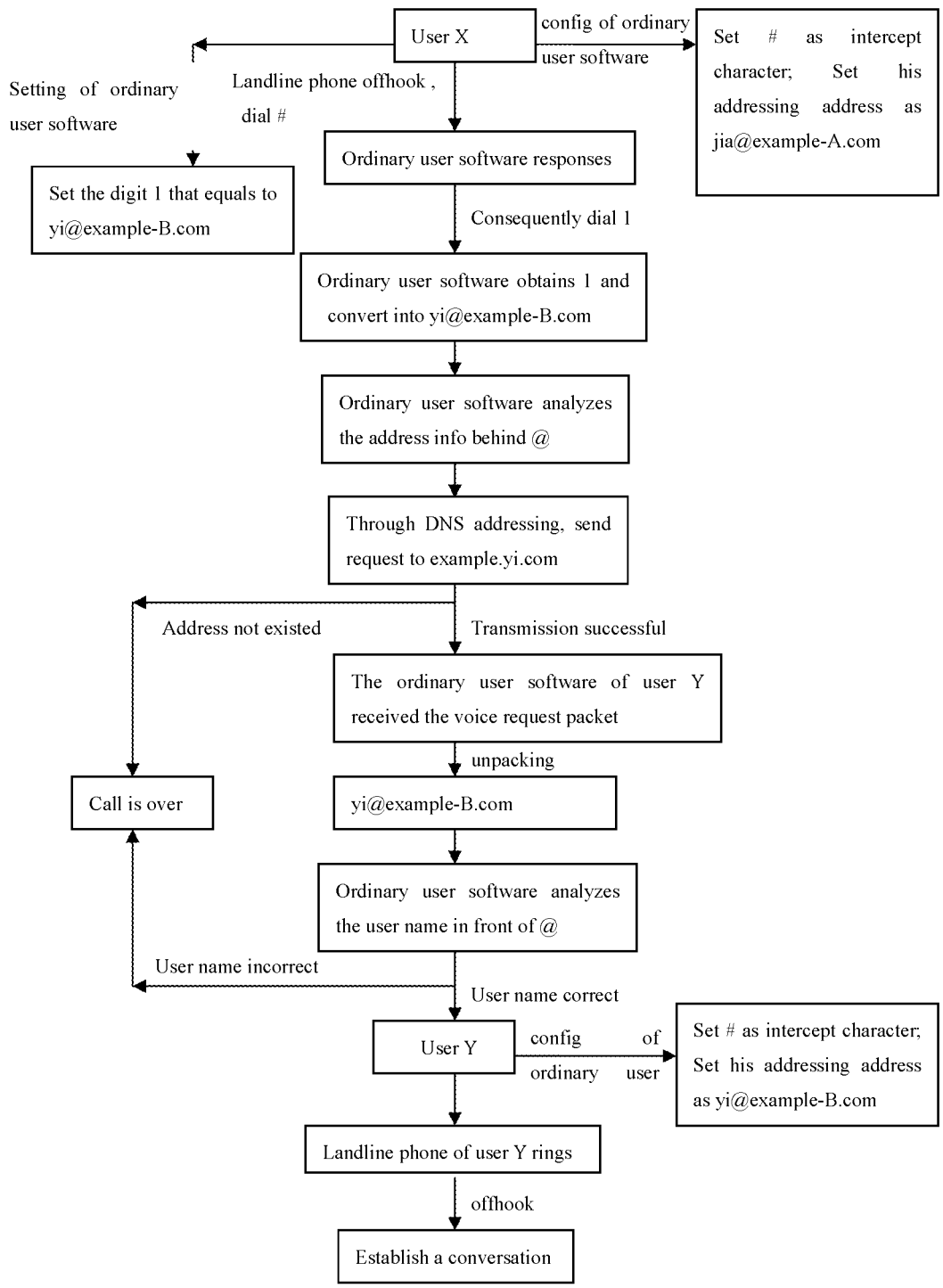
FIG. 10: a flow chart of calling in an embodiment in which an ordinary user deploys this invention.

Ordinary User Terminal Initialization:

User X sets # as the intercept character (which is mainly to intercept the voice calling request, so as not to send the request to PSTN) at ordinary user terminal, set his addressing address as jia@example-A.com, and set the phone digit 1 (this digit is customized and its length is determined by user) as being equivalent to yi@example-B.com. User Y sets # as the intercept character (which is mainly to intercept the voice calling request, so as not to send the request to PSTN) at ordinary user terminal, set his addressing address as yi@example-B.com. After finishing the initialization, user can achieve call dialing. In details:

a) User X takes telephone receiver off the hook, firstly dials # to trigger, through the processing of telephone set, it becomes analog signal that contains dialing information, and is sent to the PC installed with ordinary user terminal. The PC responses and establishes connection. The PC will obtain the analog signal through the voice interface card, and convert it into digital signal through coding/decoding. Based on judging the digital signals are of [#], the PC ordinary user terminal will consequently intercept the analog signal (The so-called intercept refers to that the ordinary user terminal obtains the analog signal in the voice interface card based on the interface function provided by the voice interface card so as to change the transmission route of the signal, namely that the signal won't pass the PSTN net. On the contrary, the signal will not be extracted and will be transmitted to PSTN net according to the set route of voice interface card if the digital signals are not of [#] based on judging). Then the user speaks "1" towards the microphone (we here adopt the speech recognition control, which is a common technology means, and is therefore not described any more here. Button operation can certainly be adopted as well), the telephone set will process the voice into analog signal and send it to PC.

b) The PC installed with ordinary user terminal receives the analog signal through the voice interface card, and processed it into digital signal through coding/decoding. Through the speech recognition engine, the ordinary user terminal of user X will extract the voice information [1] from the digital signal, and then the ordinary user terminal will convert the voice information [1] into the data packet in which the set addressing address is yi@example-B.com.

c) The PC installed with ordinary user terminal resolves the server address example-B.com behind the separator @. If the server address is valid and existed, the PC of user X will send, through DNS (domain name server) addressing, the voice request packet to the server address example-B.com behind the separator @.

d) The ordinary user terminal receives the voice request packet, and will unpacketize it and resolve the user name yi in front of the separator @. The ordinary user terminal will judge whether the user name yi is the user name set by user Y.

e) And if the user name yi is the user name set by user Y, it will initiate the ringing request to the landline phone of user Y through the PC voice interface of user Y, and in the meantime, send the call request to the client terminal of user Y.

f) The telephone set of user Y rings, and in the meantime, the client terminal of user Y responses, and user Y can establish a conversation by means of taking off the hook or accepting the request of the client terminal. (The calling process is shown in the flow chart of calling in the mode of ordinary users in FIG. 10; the voice data transmission in hardware is shown in data transmission diagram in the mode of ordinary users in FIG. 11). The above case is an example in which the call is from landline phone to landline phone (or PC). The PC can call directly the landline phone (or PC) and the step a and b can be omitted; When PC initiates calling, it is not necessary to receive the analog signal, but directly enter into step c, and in this case, the 1 in step c is not extracted from the voice information, and instead, the digit [1] that user speaks to microphone is obtained by the PC voice recognition engine of ordinary user terminal, and it then is converted, through ordinary user terminal, into the data packet in which the special character acts as the separator (yi@example-B.com); the subsequent steps are the same.

From the above, the invention solves the cost problems for call dialing from landline phone to landline phone, landline phone to software telephone and software telephone to landline phone. The invention can nearly decrease the call charge to zero, and moreover, the cost for hardware of the invention is very low and is suitable for large, medium and small enterprises, as well as individuals.

Particular embodiments of the present invention are described in the above, but the protection scope of the present invention is not limited thereto. And alternative or modification which is made by any person skilled in the art according to the technical schemes of the present invention and its inventive concept within the technical scope disclosed by the present invention should be covered within the protection scope of the present invention.

What is claimed is:

1. A method of real-time Voice over Internet Protocol (VoIP) calling between a calling user to a destination user, comprising:
    a) the calling user dialing on a first landline phone and sending a first dialing information to a service terminal of the calling user to establish a connection;
    b) the calling user further dialing the number on the first landline phone and sending a second dialing information to the service terminal of the calling user, wherein the second dialing information is associated with an addressing address stored in the service terminal of the calling user, said addressing address comprises a destination user name, a separator and a destination address, wherein the destination user name and the destination address are separated by the separator,
    wherein the service terminal of the calling user resolves the destination address on one side of the separator, and sets up a connection with a service terminal of the destination address,
    c) wherein the service terminal of the calling user resolves information of the destination user name on the other side of the separator, and sends information of the destination user name to a service terminal of the destination address,
    d) wherein the service terminal of the destination address resolves the information of the destination user name, and corresponds the information of the destination user name with user information stored in the service terminal of the destination address, and when the information of the destination user name matches information of a user information stored in the service terminal of the destination address, the service terminal of the destination address identifies information of a second landline phone associated with the destination user stored in the service terminal of the destination address, and
    e) wherein the service terminal of the destination address initiates a calling request to the second landline phone, wherein the second landline phone is the landline phone of the destination user.

2. The method of claim 1, characterized in that the act of dialing on the first landline phone in said step (b) is button dialing or voice dialing.

3. The method of claim 1, characterized in that the separator in said step b refers to a symbol for distinguishing the user name from the destination address.

4. The method of claim 3, wherein the destination address is an IP address, a domain name, or a host name.

5. The method of claim 1, wherein the first dialing information is in a form of analog signals.

6. The method of claim 1, wherein the second dialing information is in a form of analog signals.

7. The method of claim 1, wherein the first landline phone is an analog phone.

8. The method of claim 1, wherein the second landline phone is an analog phone.

* * * * *